Patented Oct. 15, 1940

2,218,475

UNITED STATES PATENT OFFICE 2,218,475

FOOD PRODUCT AND METHOD FOR PRODUCING IT

Albert Musher, New York, N. Y., assignor to Musher Corporation, Elizabeth, N. J.

No Drawing. Application June 24, 1939, Serial No. 280,971

4 Claims. (Cl. 99—182)

The present invention relates to food products, and it particularly relates to the preparation of food products with hard or plastic fats, or with materials containing these fats.

When water coated, or high water containing food materials are mixed with fatty materials there results many disadvantages. For example, the fat does not adhere to the food material, or a disagreeable flocculency appears.

Also, when food pieces such as meats, fish, fruits and vegetables for example are preserved or sterilized by heat treatment, they tend to become oily or watery or soft and mushy, particularly upon standing.

Also, when an emulsion or emulsion-like product is heated with a food in the preservation process, as for example, by sterilization, an unacceptable condition results due to the separation of the fat and aqueous phases.

It is therefore among the objects of the present invention to provide water coated or water containing food materials which will tend to retain their firmness and unity after they have been heated and while they are in their canned or preserved form, and which will be adhereable with the fatty material, particularly hard or plastic fat material, and which will provide other new qualities as, for example, improved homogeneity, more ready and smoother spreadability, elimination of flocculency, and the enabling of normally breakable emulsions with which they are mixed to be reconstituted into homogeneous form.

Other and further objects and advantages will also appear from the more detailed description given below, it being understood, however, that this more detailed description is given by way of illustration and explanation only, and not by way of limitation, since many changes therein may be made by those skilled in the art without departing from the scope and spirit of the present invention.

Depending upon the types of products used, the types of hard fats or hard fat products that are used, the general results that are desired, and so forth, various methods may be used, such as are disclosed herein, to accomplish the results of this invention. Among these methods, three of the general embodiments that may be used comprise either:

1. Heating the fatty product, or the food mixture together with the fatty product, to a temperature just below the melting point of the fat, and usually to a relatively thin plastic condition, and then, preferably, to mix all together well, or 2. Heating the fatty product or the combination of the food material with the fatty product until the fat melts and then agitating or mixing together while cooling, or 3. Heating the fatty food, or the combination of the fatty food with the food material, to a relatively high temperature so as to impregnate the fat within the food pieces and then agitating or mixing while cooling.

Various food products that may be used in conjunction with this invention are, for example, salmon, tuna fish, chicken, meat, vegetables such as cooked carrots, or tomatoes, or also fruits such as oranges, grapes, apples, and so forth.

It has been found that not only hard or plastic fats, or fat mixtures, or products containing a relatively high amount of fat may be utilized in carrying out this invention but that also water-in-fat emulsions produce unusual results, in that there now results a smooth homogeneous material instead of the usual flocculent or emulsion-separated result.

Also, with oil-in-water emulsions, even when they contain a relatively high amount of liquid oil, the use of a hard or plastic fat surprisingly results in a homogeneous end product which may be broken or separated upon the application of heat but which now reconstitutes itself in the final product into emulsion-like form without the usual procedure of having to add the oil slowly, etc.

In accomplishing this invention, it is generally necessary for the fat containing material to have sufficient contact with the food material with which it is being mixed, and for the fat that is contained therein, to be in a very thin plastic, or preferably in a liquid or molten condition when it contacts these food materials. This is particularly of importance where fat or emulsion impregnation, or adhesion, is desired.

Apparently, the hard fat draws water from the pores of the food material so as to form a new emulsion-like product. Further there is an impregnation of the fat within the pores of the food piece, particularly after congealing which produces the anchoring or clinging action that thereby enables the adhesiveness of the fat material to the food piece. The hard fat material or the water-in-fat emulsion which may be in the form of a flavoring material or other food product, after it has congealed in the final product, now appears surprisingly to have its original undesirable lardy and fatty taste reduced or eliminated.

Further, oil-in-water emulsions, as for instance emulsions containing 50% or 60% or more of liquid oil, as for example flavoring materials, dressings, etc., may now be heated with food products to preserving or sterilizing temperatures for adequate periods of time, in which event the emulsion will break and separate but, by utilizing hard fat and particularly a plastic fat in accord with this invention it will be unexpectedly re-formed into an emulsion-like or homogeneous product in conjunction with the base food material. This procedure heretofore has not been possible, but now there has been made possible this utilization of water-in-oil emulsions in canning and preserving procedures, where heat sterilization is required.

For instance, tuna fish may first be cooked as required, and then cut into flakes, or into pieces. Then 40 grams of the tuna fish pieces are placed into a can with about 15 grams of water, if desired, and with 20 grams of a water-in-fat, emulsion-like product comprising the following ingredients:

| | Grams |
|---|---|
| Plastic hydrogenated cottonseed oil of 108° melting point | 450 |
| Salt, sugar and spices | 60 |
| Gum tragacanth | 7 |
| Vinegar | 210 |

This product is made by mixing together the sugar, tragacanth, salt, and spice materials with the plastic fat, and then adding the vinegar slowly to the mixture while beating it.

Also, if desired, 10 or 20 grams, etc., of an oil-in-water emulsion may be utilized with the above product. This oil-in-water emulsion may consist, for example, of the following:

| | Grams |
|---|---|
| Mixed whole egg | 15 |
| Salt, sugar, spices | 6 |
| Liquid cottonseed salad oil | 75 |
| Vinegar | 10 |

This oil-in-water emulsion is made by adding the spices to the egg and mixing thoroughly. Then add one-half of the vinegar. This is followed by adding the oil very slowly while mixing the product rapidly. At the end of this mixing, the remaining part of the vinegar may be added and mixed therein.

The oil-in-water emulsion as described herein, may, or may not be added to the water-in-fat emulsion depending upon the embodiments desired. If it is used with this fat emulsion product, it should generally be mixed therein rather thoroughly, or both emulsions may be added to the can separately.

Thereupon the water-in-fat product, with or without the oil-in-water emulsion, is added to the cooked tuna fish pieces and placed within the can. Generally it is not necessary to mix the fatty materials with the tuna fish or with the other food products at this point, particularly where it is desired not to mash or disintegrate, or materially affect the unity of the food pieces. If the fatty emulsion or other fat material is placed into the can or other container along with the other food material, the melting of this fat material will usually be all that is required to give the necessary dispersion within the food at this point.

After the base food and the fatty material have been placed together within the container, they may be sterilized at a temperature of for instance, 250° F. at a pressure of 15 pounds per square inch for a period of 75 minutes, or for the required length of time depending upon the size of the container that is used. After this, the cans are placed into cold water, and particularly into very cold water, and they are rolled, or preferably, they are strongly agitated, until the fatty material within the container has congealed, or until it has become sufficiently plastic or hardened to retain a relatively homogeneous condition.

The oil-in-water emulsion in this product is in a homogeneous condition instead of the usual separated condition. Also, there is not the usual flocculency that would result if the tuna fish, hard fat material, and water of the preceding example were merely mixed together.

The watery or oily flavor elements that normally exude from the base food material when it is heated and which are usually lost when poured off by the consumer from the can, now, are captured by the hard fat which either emulsifies or otherwise holds these materials thereby retaining a large amount of the otherwise lost flavoring elements. Also, the flavor of the food is enhanced because the fatty materials encompass the food particles and protect them from complete contact with the metal cans.

As a result of this method, instead of the fat being a component that is separate and apart from the chicken, or fish, or other base materials that are canned therein, this emulsion, or fat product is now an integral part of the packaged food. Likewise, in the canning of fruit salad, or vegetables, for instance, where the water portion is generally drained off, when the can is opened, the water portion from the fruits or vegetables is now to a large part absorbed or retained by hard or plastic fat products of this invention.

These fatty products, as used herein, have the advantage of retaining both the water-flavor, and also the oil-flavor properties of the foods. This is accomplished by dissolving the fatty flavors and by emulsifying the water soluble flavors.

There is thereby produced an entirely new result that heretofore has not been possible in the canning or preserving of food materials. These fats thereby become an integral part of the canned product rather than an accessory product which is discarded or not fully utilizable after the container has been opened.

By the use of water-in-fat emulsions, or hard fat-containing emulsions, or emulsion-like products as described herein, there is a still further advantage in the canning or preserving of foods. This advantage is that the emulsion will act as a liquid canning medium while the product is being sterilized, but, after sterilization has been effected, the product may be returned to a condition where there is relatively no liquid material present. This thereby reduces the amount of waste and liquid materials that are later poured off when the can is opened, because they are not an integral part of the food material.

Still further, by the use of emulsions, and particularly by the use of water-in-fat emulsions, there is provided a new type of canning medium in that there is present, not only fat, but also aqueous materials. It is now possible to use a canning medium which contains both the oil and water element so as to enhance the quality and flavor of the canned food product, and also, at the same time, there is produced a canning medium which acts in the form of a liquid canning medium as is required during the canning operation, but, when the package or can is opened, there is not found the usual liquid materials which are normally discarded and wasted.

Also, hard fat, in conjunction with high water containing food materials may be used, or additional water or aqueous materials may be added to the food, so as to enable various advantages. The product is then canned in the usual way, and then, when the package is agitated and cooled, the emulsion-like or homogeneous product will be produced accordingly.

The resulting canned food products produced under this invention are also in a much more homogeneous, and more palatable condition than normally canned food products which are packed in liquid oil or water mediums.

Also, the flavors of these canned food products are now much more highly developed and these flavors are much more completely retained within the food material, in view of the protective nature of the hard fat.

In the preparation of the food products of this invention it is generally necessary to flake these food materials, or to utilize them in the form of relatively small pieces. They may be mashed, also, where required.

This procedure is desirable in view of the fact that it is preferred to get as close and as intimate a contact as possible of the fatty material with the base food material. This will result in the maximum amount of flavor absorption by the fat, and also it will result in the maximum amount of fat protection being given to these flavor and food materials after congelation.

Also, in the carrying out of this invention, the container containing the food product, after the canning or sterilizing procedure, should be agitated and cooled, and preferably it should be subjected to a quick chilling, until the hard or plastic fat therein has become congealed at least sufficiently to retain a homogeneous condition with the aqueous elements that are present.

The object of the quick chilling, particularly at relatively low temperatures, among other reasons, is to harden the fatty material within the structure of the food pieces, so as to effect an anchoring of this fatty material within the food piece, and thereby so as to produce the increased amount of adhesion of the fatty materials thereto, after it has congealed. The chilling operations of this invention may be carried out in any of the known methods as, for instance, in a chill room or in ice water or cold water, and so forth.

In the embodiment of this invention, it is now possible to obtain altogether novel types of food products in which the fatty product, or the water-in-fat emulsion, or the oil-in-water emulsion, is now an integral part of the entire canned or packaged product, instead of having this fatty flavoring or dressing material, or this cooking medium, being a substantially individual and separated part of the final packaged food.

Still further, the use of smaller pieces of food, rather than having the food in one large single piece, has the advantage in the carrying out of this invention in that these smaller food pieces produce more or less of a beating or mixing action when the cans or packages are being rolled or agitated. This thereby enhances the qualities of the finished canned or packaged product by enabling an enhanced mixing or homogenizing procedure within the package, while the product is congealing.

The embodiments of this invention are of particular use in conjunction with food products which are of a relatively high water content, or which require additional water or aqueous materials in order to produce the required finished food. It is particularly in conjunction with foods of this kind that the embodiments of this invention are of most advantage, in view of the nature of foods of this kind to produce flocculent, separated, heterogeneous products when mixed with hard fat materials. Water or aqueous materials therefore, can now be added to the products of this invention in order to produce new qualities of smoothness, and flavor, and, at the same time, a hard fat component may be utilized so as to result in the required thoroughly dispersed and homogeneous quality of the finished product.

It is generally not desirable to use a fatty material of this invention, as the cooking medium for these products, particularly where this fatty material is in the nature of a flavoring or dressing material, and where too long a heat treatment in conjunction with the base food material, might produce some loss or undesired change of flavor, or other deteriorative effects. Therefore, it is generally advisable, in these cases, and in many other cases, to first cook the base food material, at least partially, in the normal cooking mediums whether they be water, or oil, etc., and then to drain off this cooking medium. Then, the product may be mixed with the hard fat product of this invention and it may then be sterilized and packaged in accord with the herein procedures.

In those instances where there is a substantial quantity of water in the food pieces, particularly in connection with boiled or cooked food products, or where there is a substantially large amount of water present in the entire mixture, it is often desirable to include in the hard fat, or in the product itself, a water absorbent bodier material such as starch, gelatin, pectin, gums such as gum tragacanth, gum karaya, and so forth. These will have a tendency to gelatinize the water that is present and thereby enhance the smoothness, and homogeneous quality of the finished product.

Of course, in these cases, the amount of water absorbent bodier may be of whatever amount is desired, but generally, it should be sufficient to gelatinize the water present, even if it is gelatinized into a relatively thin jelly product. Instead of adding these bodier materials in the form of dry materials, improved qualities may at times be obtained by first gelatinizing them with water, or with the excess water of the food materials, and then adding these gelatinized materials to the food in this gelatinized condition.

The hard fat that is used should generally be present in sufficient quantity to produce the protection or reconstitution or similar results described herein.

Another advantage in the use of hard fat materials in conjunction with fibrous food products such as meats, is that these hard fats, when impregnated within the base food material have a tendency to keep the fibers or the resinous substances in a softer, and therefore substantially more edible, and substantially more digestible condition. This condition is particularly enhanced in those cases where the foods are flaked, or cut into small pieces as herein described.

A further advantage of the resultant products of this invention is the improved smoothness in spreadability quality. Also these food materials exhibit entirely new characteristics in that they may now be more conveniently molded into various shapes for garnishing purposes because of the impregnation of the fat into the structure thereof.

Also, there is reduced oxidation and loss of flavor in view of the protective nature of these hard fat coatings which are congealed and allowed to remain within the structure of the food products.

In the carrying out of this invention, although sterilizing temperatures may be employed as herein described, nevertheless it is possible to utilize lower temperatures to melt the fat, and then to mix with the food materials as herein described. Of course, at lower temperatures, the impregnation of the fats into the inner structures of the food pieces, so as to produce the fullest extent of interior protection to the food piece, is not effected.

In the usual procedure for canning or heat-treating food products, the cells of the food products are generally broken so as to permit the exudation of the fatty and watery materials that are contained therein. This exudation may continue not only during cooking but, also, as the product stands during storage.

This liquid material, which contains a large part of the flavor elements of the foods are generally discarded by the consumer when the can or package is opened. However, now, in accord with this invention, by the congelation of the hard fat within the food structure, and particularly when quick chilling is employed, whether or not the products have been cut into smaller pieces, there is a tendency for the hard fat to hold, or at least to hold these flavoring materials within the structure of the food piece. Then, when congelation takes place, and as the fat congeals within the food piece, these flavoring materials are held within the structure of the food material.

Thereby, when the food material is used, there is a substantial amount of these flavoring elements that are retained within the food piece, which originally were there, but which, under the usual canning methods, are eliminated.

Furthermore, by the use of the hard fat materials as herein described, whether or not the products are cut into small pieces, and particularly when relatively quick chilling takes place, the hard fat, by remaining within the structure of the food, better retains the bound water and other water portions of the food within the product. Thereby the product retains its softness of fiber and structure and with consequent increased digestibility of the final food product.

Further, when the pieces of food are ready for consumption, aside from having the increased digestibility and other nutritional qualities, they possess altogether new plastic and readily spreadable qualities, because of the retained ingrain of the fat therein.

By the term "hard fat" as used herein, is meant any naturally or artificially hardened or plastic oil or fat whether of animal or vegetable origin, or any combination thereof. Liquid salad oil of course may be used in the preparation of the hard or plastic fat, but in the final product, the fat should be of a consistency that is hard or plastic at room temperature.

For many uses, in the embodiments of this invention, plastic fats as for instance, hydrogenated cottonseed oil of about 100° F. to 108° F. melting point, for instance, are preferred. Various types of oils that might be used in these embodiments are olive oil, cottonseed oil, corn oil, cocoanut oil, palm kernel stearin, oleo oil, oleo stock, oleo stearin, lard, and so forth. In some cases, small quantities of edible beeswax, or paraffin or mineral waxes, and so forth, may be used to provide various characteristics in body, etc., of the fatty material.

The nature of the fat that is used should in many cases be of a relatively gummy or heavy plasticity rather than of a thin, oily plasticity. This enables enhanced anchorage and adhesion to the food pieces, and retention of the fat within the food pieces upon congelation.

With the fat materials as herein described, may be used oil-in-water emulsions, or these fat materials may be in the form of water-in-fat emulsions, or they may be in the form of other food materials containing hard fats therein. Also, these hard fats or fatty containing foods may have contained therein various flavoring materials as for instance salt, sugar, lemon, lemon juice, honey, or water absorbent binder materials, as for instance starch, gum, pectin, etc.

In the embodiment of this invention there may be desired, in many cases, to dry the base food material by absorbing the excess moisture therein or by draining the excess moisture therefrom, and then treating the product in accord with this invention. This has a tendency to enhance the reduction of the flocculent or separation quality.

Also, a very unusual result in the embodiment of this invention, particularly when high water containing materials are used, and particularly where the water is present as free water, or when there is substantial water or aqueous material present in the mixture, is to add some liquid oil to the mixture prior to the canning operation. This is quite advantageous in that any flocculency that results is now substantially reduced or eliminated.

For instance, a fruit salad with a fat dressing is produced by utilizing normally canned fruit salad mixture, hard fat, and liquid salad oil. Such a product, for example, may be made by utilizing the canned fruit salad, said fruit salad already having been cooked so as to develop the required softness of the pieces therein. This fruit salad is then drained of its free aqueous material, and the pieces are then rolled in an absorbent paper or cloth so as to pick up as much of the excess water as possible that remains on these fruit pieces.

Of this combination of fruits, which consists of pineapple, peaches, cherries and pears, 40 grams is placed into a small can. On top of the fruit salad there is then placed about 20 grams of an intimate fat mixture prepared from 450 grams of 108° F. melting point hydrogenated cottonseed oil, 60 grams of sugar and salt, 7 grams of gum tragacanth, and 210 grams of vinegar. This fat mixture is mixed together as explained in the example heretofore given in the making of the tuna fish product.

There is then placed into the can along with the fruits and the fatty material as above described, 15 grams of liquid corn oil, together with about 20 grams of water, if desired.

If desired, an additional amount of bodier material as for instance gum tragacanth, may be thoroughly mixed with the hard fat mixture, or with the liquid salad oil, before these are added to the can. This bodier material in many cases will further enhance the procedure and the result. Also if desired, fat alone may be used in place of the hard fat mixture described above.

The can is then exhausted in boiling water for about 15 minutes, and the top of the can is then placed thereon and the can sealed.

The can is then heat treated for 20 minutes at a temperature of 240° F. and at a pressure of 10 pounds per square inch. Thereupon, it is immediately placed into cold water and agitated while it is cooling, as herein described.

The resultant product will be a fruit salad intermixed with a homogeneous fatty dressing. It has been impossible heretofore to produce a similar homogeneous dressing composed of fatty and aqueous materials, without the expected separation or flocculency that results. However, now, the use of the hard fat material, enhanced by the new characteristics that are produced by the liquid oil that is used therewith, produces an entirely new and unexpected result, because, there now results an entirely new smoothness and homogeneity in the resultant product.

As noted herein, this is quite an unexpected result in view of the fact that it would normally be expected that when the liquid oil is added, that this would have a tendency to further increase the possibility towards separation into aqueous and oily layers, particularly under these conditions of high heat. However, to the contrary, and quite unexpectedly, it is found that the use of this liquid oil actually reduces and eliminates this tendency towards flocculency and non-separation, and results in a relatively homogeneous product.

Whereas hard fat alone may be used in conjunction with the above example, or with the other examples herein described, it appears however that the use of a water-in-fat emulsion or emulsion-like product produces new and different results and qualities in the finished product.

Also, new and unusual results are produced when a substantially increased amount of bodier material as for instance, gum tragacanth, is used in conjunction with the liquid oil, together with the hard fat component and base product of this invention. For example, into a small can there may be placed 40 grams of tuna fish chopped into small pieces, and thereon there may be placed 25 grams of water, 10 grams of liquid corn oil which has previously been well mixed with 2 grams of powdered gum tragacanth, and 40 grams of the fat mixture as described in the preceding example.

If this product is processed and canned as also described in the preceding example, a very homogeneous product will result due to the combination of the tragacanth and oil in conjunction with the fat product. There is produced a product which has entirely new spreadable, smooth, and non-separated qualities.

What I claim is:

1. A hermetically sealed, commercially sterilized food composition comprising a water-containing, relatively solid base food, a hard fat, an aqueous material and a liquid oil, said hard fat, aqueous material and liquid oil being present in the form of a relatively emulsion-like product, said base food and said emulsion-like product being in a relatively homogeneous condition in their combined form.

2. The food composition of claim 1, the emulsion-like product being of an oil-in-water type emulsion.

3. The food composition of claim 1, the emulsion-like product having included therein a water absorbent material, the emulsion-like product having combined therewith a portion of the flavor elements that has been taken up from the base food, and said emulsion-like product also being at least partially impregnated into portions of the base food.

4. The process of preparing a hermetically sealed, commercially sterilized food composition comprising a water containing, relatively solid base food, a hard fat, an aqueous material and a liquid oil, with the hard fat, aqueous material and liquid oil being present in the form of a relatively emulsion-like product, and with the base food and emulsion-like product being in a relatively homogeneous condition in their combined form, said process comprising comminuting the base food into pieces of the required size, adding thereto the hard fat, liquid oil and aqueous material, heat sterilizing at the required temperature, and agitating the product thereafter until the food composition has congealed.

ALBERT MUSHER.